United States Patent [19]

Hotz

[11] Patent Number: 4,469,466
[45] Date of Patent: Sep. 4, 1984

[54] FASTENING DEVICE

[76] Inventor: Roger W. Hotz, 33 Totoket Rd., Branford, Conn. 06405

[21] Appl. No.: 849,169

[22] Filed: Nov. 7, 1977

[51] Int. Cl.³ .............................................. F16B 7/18
[52] U.S. Cl. ................................... 403/388; 403/409; 403/406; 403/262
[58] Field of Search ........................ 403/3, 4, 188, 199, 403/205, 231, 245, 262, 403, 405, 406, 409, 388; 85/50 A, 50 C

[56] References Cited

U.S. PATENT DOCUMENTS

| | | | |
|---|---|---|---|
| 3,006,443 | 10/1961 | Siler | 403/408 |
| 4,021,991 | 5/1977 | Hotz | 403/409 X |
| 4,073,329 | 2/1978 | Hala | 85/50 C X |

FOREIGN PATENT DOCUMENTS

| | | | |
|---|---|---|---|
| 2064721 | 7/1972 | Fed. Rep. of Germany | 403/406 |
| 498418 | 5/1976 | U.S.S.R. | 85/50 B |

Primary Examiner—Andrew V. Kundrat

[57] ABSTRACT

An adjustable fastening device such as an insert or appliqué with an integral slot and wedging mechanism that can be affixed by means of a connecting bolt to one member so that its position can be adjusted along the slot relative to another member.

25 Claims, 20 Drawing Figures

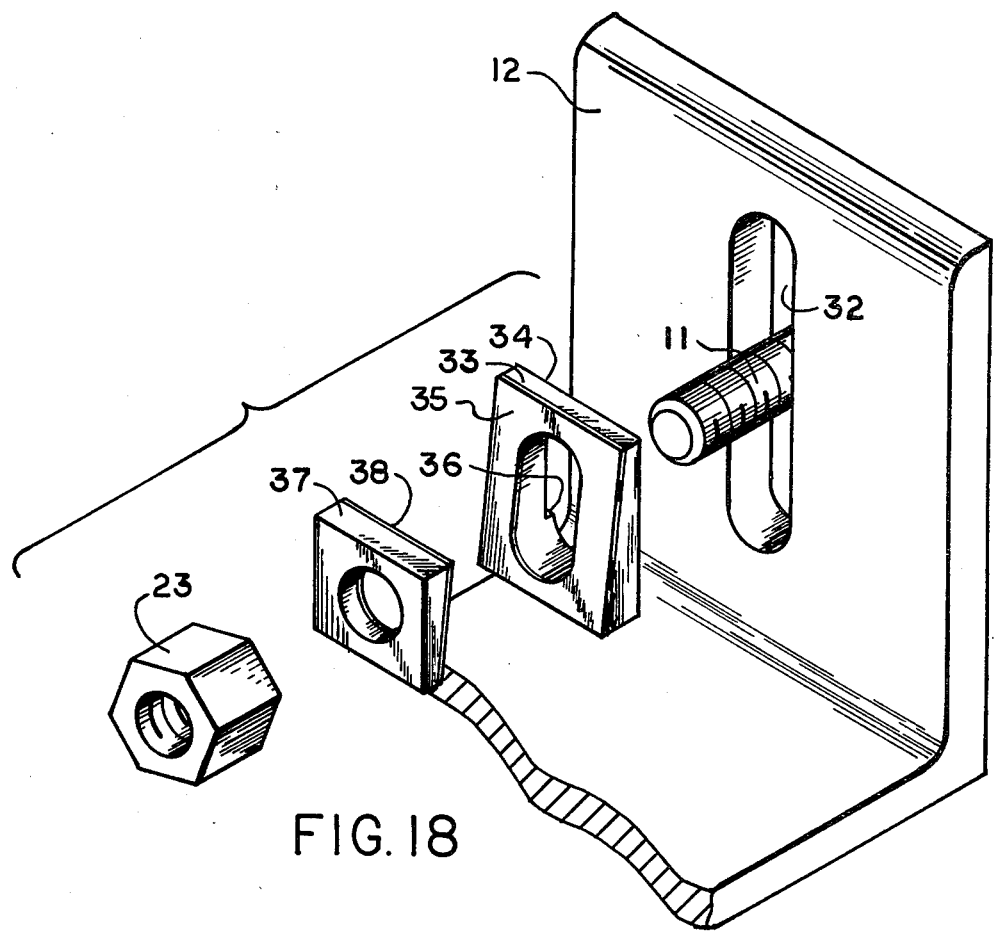
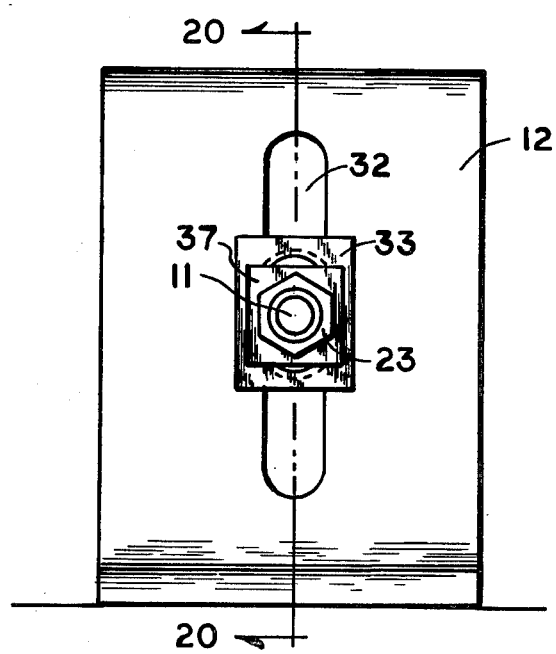
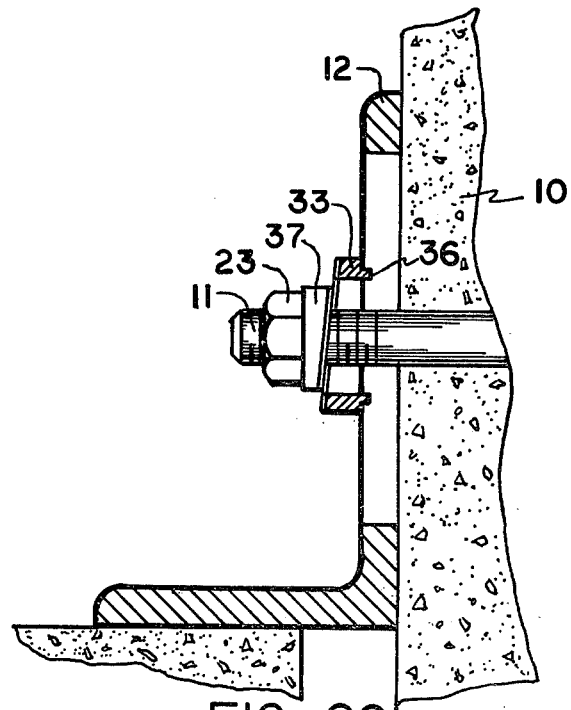
FIG. 18
FIG. 19
FIG. 20

4,469,466

FASTENING DEVICE

BACKGROUND OF THE INVENTION

The present invention relates to adjustable fastening devices for rigidly fastening one member to another member with the members or their anchorage at variable positions with respect to each other, and it relates more particularly to means that utilize a wedging principle to provide a positive fastening means with the members at their various positions.

There are numerous situations in which a means of adjustable support must be provided between two members. For instance, for the attachment of facade panels to building structures, it is common practice to provide such adjustable anchorage. Due to tolerances inherent in the manufacture of panels and in the construction of building frames, variations from the theoretical location of any connecting devices in the panel and the relative position of any anchorage provided on the structure can be expected. Likewise similar means of adjustable support are often used for attachment of other types of facade components to building structures.

Panels are frequently supported on the building frame by means of support angles anchored to the structure directly or through the floor slab by an anchor bolt which projects through a hole in the horizontal leg of the support angle. The panel is attached to the vertical leg by a connecting bolt suitably anchored and projecting from the back of the panel. Additional anchorage and ties are provided as required for lateral support. Adjustments have often been accomplished with various combinations of slots and shims, inserted and removed from between attachment surfaces. Shimming is a sometimes trial-and-error, time consuming process. Slots are not usually considered satisfactory for vertical adjustment, except for the lightest of panels, unless they are provided with an integral wedging device so as to provide positive load support at any position in the slot.

Various wedging devices are widely used, but each has certain limitations which make them impractical for some applications. Many require embedment in concrete of an insert with an integral inclined plane. The wedging mechanism can be located at the vertical leg of the support angle by attaching an inclined surface for engagement with an askew head bolt or a bevel washer, or a special tapered slot can be formed in the angle leg for wedging engagement with a double tapered bushing or nut as disclosed in my prior U.S. Pat. No. 4,021,991. In the one method, the beveled surface device must be prevented from movement relative to the angle by mechanically fastening or more usually by welding. In the other case, equipment not available to some fabricators of support angles is required for forming the tapered slot. Another consideration is that in some instances it is desirable that both horizontal and vertical adjustments in the plane of the panel be made at the bolt connecting the panel to the support angle. Unless a slotted insert can be cast in the panel, such a two-way adjustable connection can only be made with considerable difficulty.

It is accordingly an object of the present invention not only to provide a method for making load supporting, two-way adjustable connections, but also to provide a simpler method for adapting clip angles for wedging type adjustable attachment of one member to another.

SUMMARY OF THE INVENTION

One part of the invention resides in placing in a support member a hole to receive a standardized insert that allows adjustment and provides positive support in the direction of applied load when a connecting bolt is tightened, and when the hole is essentially round, permits adjustment in a direction perpendicular to that of the applied load. The insert is provided with a slot, the longitudinal walls of which converge in the direction of applied load. A double tapered bushing, fitted over a connecting bolt which is fixedly attached to a second member, is forced into wedging engagement with the walls of the tapered slot by a nut threaded onto the connecting bolt. Thus, as a load is applied, bolt tension is induced as a result of resisting displacement of the bushing along the length of the tapered slot. The induced bolt tension is, in turn, utilized to drive the insert into rigid engagement with the support member, thereby preventing movement of the insert with respect to the support member.

Alternatively, the slot may be provided with generally parallel longitudinal side walls, and one face of the insert beveled for engagement with a simple bevel washer for similar wedging engagement and interaction of the components of the system. Obviously the wedging element may be, instead of the bushing or washer described, the head of a bolt, a nut, or the like.

It has been found in another part of the invention, which in one aspect relates to attachment of wedging devices to support members, that the force required, in addition to the friction force present between the surfaces of engagement of an externally applied inclined plane device and the support member to which it is applied, varies in direct proportion to the coefficient of friction between the inclined working surfaces of the wedging mechanism and inversely with the coefficient of friction between the surfaces of engagement of the applied inclined plane device and the support member. Further, the wedging induced tension in the connecting bolt varies in inverse proportion with the coefficient of friction between the inclined wedging planes and also inversely with the slope, or tangent, of the angle between the inclined wedging plane and the surface of engagement with the support member. Using these relationships, externally applied slotted wedging devices may be furnished with the surfaces of the wedging mechanism having very low coefficients of friction relative to the contact surfaces at the support member, and with the wedging plane inclined at a proper angle, so that application of a load in a direction generally parallel to the length of the slot induces tensile forces in a bolt, which extends through the support member and the wedging device and is fixedly attached to a second member, large enough in magnitude to generate a frictional force at the contact surfaces of the support member sufficient to prevent any movement of the inclined plane device relative to the support member. Such inclined plane devices require no interlocking engagement with the support member except, in some cases, for purposes of orientation.

DETAILED DESCRIPTION OF PREFERRED EMBODIMENTS OF THE INVENTION

With the foregoing general information in mind, reference is made to the accompanying drawings which illustrate several embodiments of the invention as it may be employed in various applications, including the attachment of facade components to building structures. In the drawings, FIG. 1 is a perspective view of a panel supported by a clip angle in which the fastening means of the present invention is employed;

FIG. 18 is an enlarged exploded perspective view of a fastening means similar to that shown in FIG. 1, but with the inclined wedging surfaces coated with a material having a low coefficient of friction relative to the coefficient of friction for the contact surfaces of the inclined plane device and support member;

FIG. 19 is an end view of the fastening means of FIG. 18 as seen when facing the inside of the panel;

FIG. 20 is a section through the connecting bolt taken on line 20—20 of FIG. 19.

Figure 1:
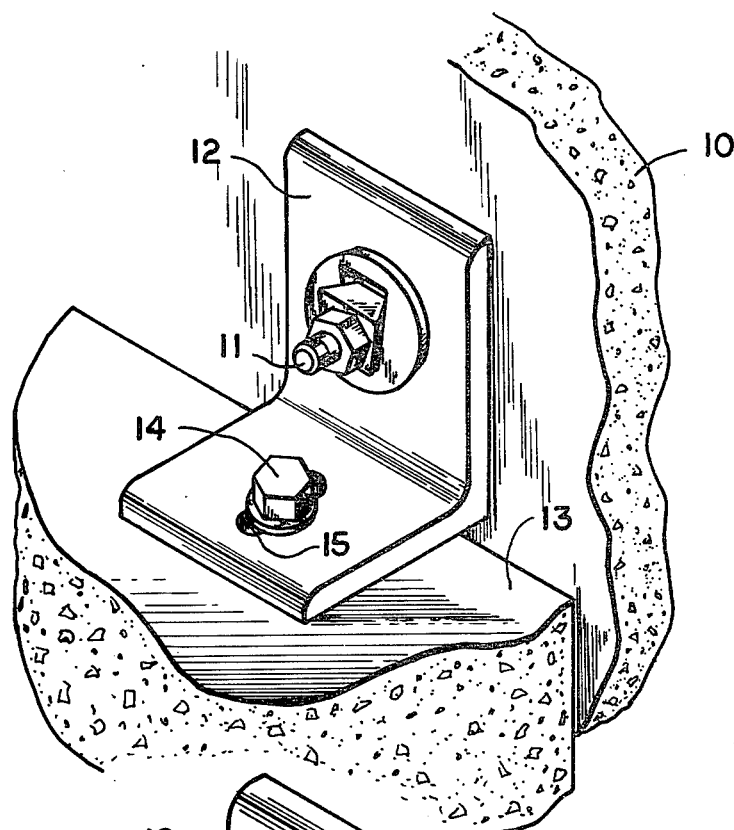
Figure 2:
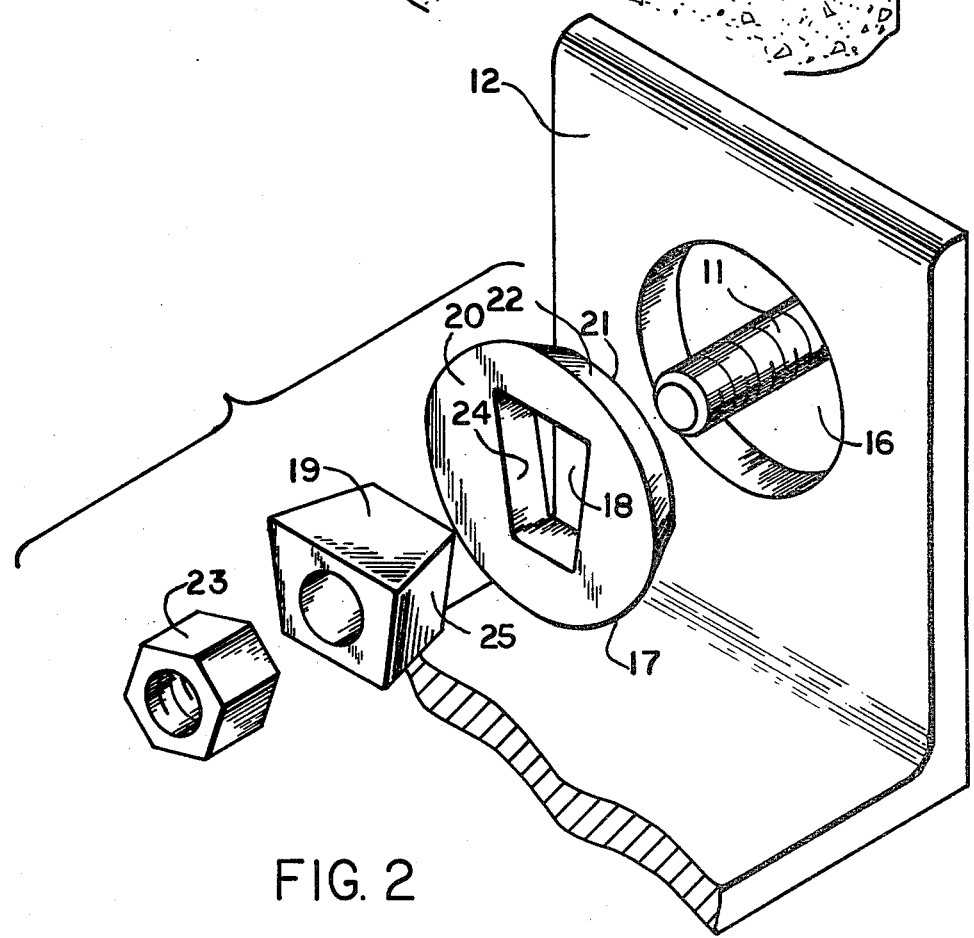
FIG. 2 is an enlarged exploded perspective view of the fastening means shown in FIG. 1.

In the specific application for the fastening means of the present invention illustrated in FIGS. 1 and 2, a facade panel 10 with projecting connecting bolt 11 is supported by a clip angle 12 which is connected to the building structure 13 by a bolt 14 through a slotted hole 15 in the horizontal leg of the support angle 12. Due to tolerances inherent in the manufacture of facade panels and in the construction of building structures, variations from the theoretical relative locations of the panel connecting bolt 11 and the bolt 14 anchoring the support angle 12 to the building structure 13 can be expected with the panel 10 is aligned in its proper position. To compensate for these variations it is common practice to provide for adjustment in the vertical and horizontal directions in the plane of the panel as well as in a direction perpendicular to the panel.

Such adjustments have often been accomplished with various combinations of shims and slotted holes. Where slotted holes are used for vertical adjustments, it is often desirable to provide for positive support of the panel with the bolt at any elevation by use of various devices based on a wedging principle. Heretofore use of the wedging principle has required embedment of a device with an integral inclined plane within the panel or attachment of an inclined plane to the back of the support angle by means of welding or mechanical fasteners, or forming in the support angle, a special tapered slot which acts in combination with a double tapered wedging element that fits over the bolt to provide positive adjustable support. The inclined plane devices require additional manufacturing steps, and there are cases where it is not convenient for fabricators to form special tapered slots.

Dimensional tolerances in the horizontal direction in the plane of the panel can often be accommodated by providing a large oversize hole in the horizontal leg of the support clip, fitting a large plate washer over the bolt anchoring the horizontal leg to the structure. In still other cases, a horizontal slot can be provided in the building structure or in the back of the panel. But there are circumstances where the only practical location of such a horizontal slot is in the vertical leg of the support clip, and unless a wedging device can be cast in the back of the panel, the installer of the panels is left with little alternative to time consuming trial-and-error inserting and removing of shims between the horizontal leg of the support angle and the building structure to place the panel at its proper elevation.

However, in accordance with the present invention, the vertical leg of the support angle 12 is provided with a large round hole 16 which can be formed with standard fabricating equipment widely available. The wedging system consists of a standardized insert 17 manufactured with an integral tapered slot 18 acting in combination with a double tapered bushing 19. It is apparent that by locating the bushing 19 in various positions along the length of the slot 18 and by rotating the insert 17 in the hole 16 in the support clip 12, dimensional variations in the plane of the panel 10 in both the horizontal and vertical directions can be accommodated. The insert 17 is wider at its front face 20 than the width of the hole 16 so that the insert 17 will not be forced through the hole by tensile forces in the connecting bolt 11. On the other hand the insert is narrower at its back or other face 21 than the width of the hole 16 so that the rim 22 of the insert is driven into solid contact with the edge of the hole 16 when the nut 23 is threaded onto the connecting bolt 11 and tightened, forcing the bushing 19 into wedging engagement with the tapered slot 18. Displacement of the bushing 19 toward the narrow end of the slot 18 cannot be accomplished without stretching the connecting bolt 11. Thus the resultant wedging induced tensile force in the connecting bolt maintains equilibrium with the applied load. The tensile force generated by the applied load is, in turn, utilized to drive the insert 17 into rigid engagement with the support angle 12 thereby preventing their relative displacement.

Accordingly, one aspect of the present invention resides in utilizing slotted inserts which are also working components of a wedging system, thereby employing wedging induced bolt tension to keep the insert firmly engaged with a hole in a support member, thereby preventing movement of the insert with respect to the support member. An inherent advantage in using inserts, which can be mass produced and attached by means of a hole to customized support clips, lies in the ability to provide shapes and designs that have certain desirable features too complex and difficult to manufacture to be practical for direct forming in customized components. For instance, in addition to being tapered so as to converge toward the narrow end of the slot 18, the longitudinal walls 24 of the slot can be beveled to provide surface to surface contact with the sides 25 of the double tapered bushing 19 to prevent displacement of the connecting bolt 11 as a result of deformation at the edge formed when the walls 24 of the slot are perpendicular to the face 20 of the insert.

Figure 3:
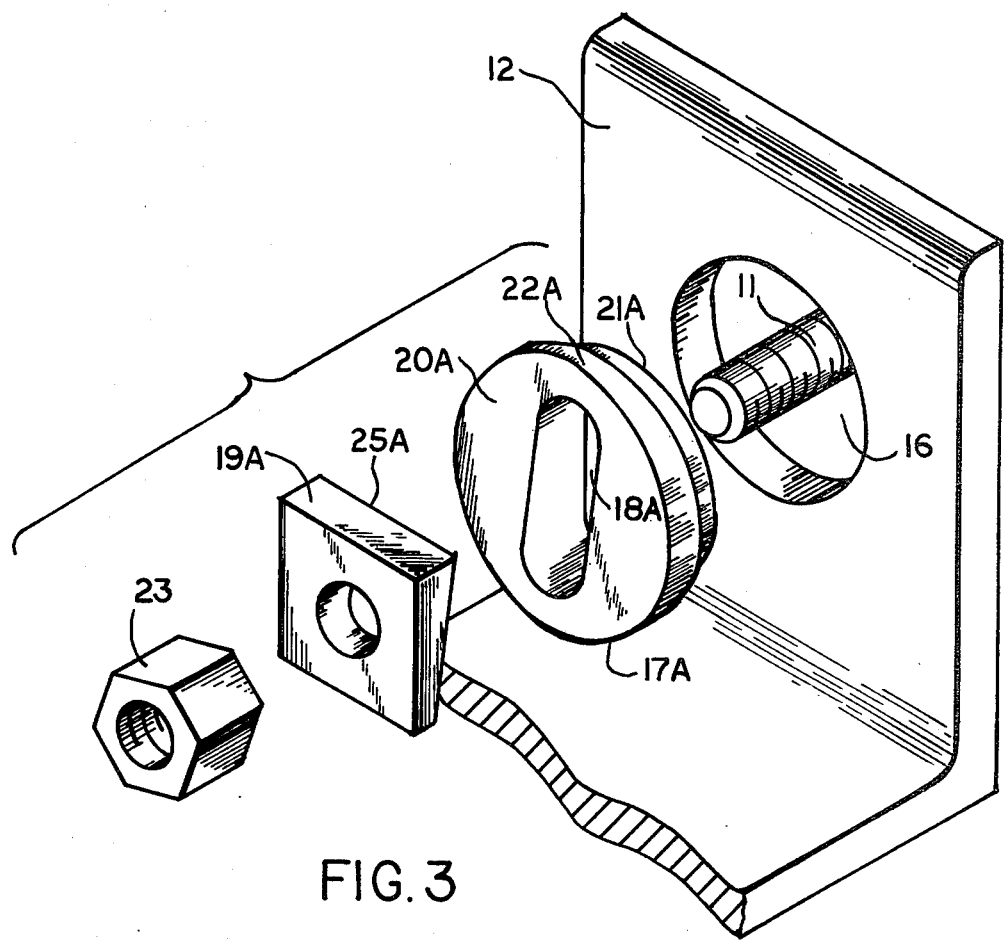
FIG. 3 is a view similar to FIG. 2, but showing the insert to have an inclined front face for engagement of a beveled washer.
Figures 4, 5:
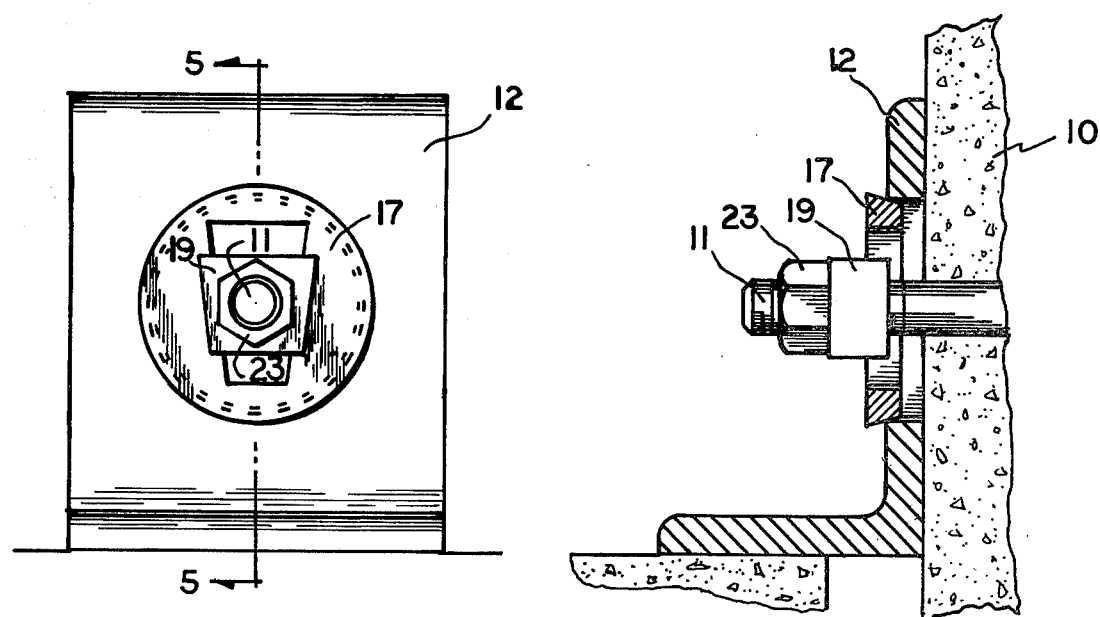
FIG. 4 is an end view of the fastening means of FIG. 2 as seen when facing the inside of the panel.
FIG. 5 is a section through the connecting bolt taken on line 5—5 of FIG. 4.
Figure 6:
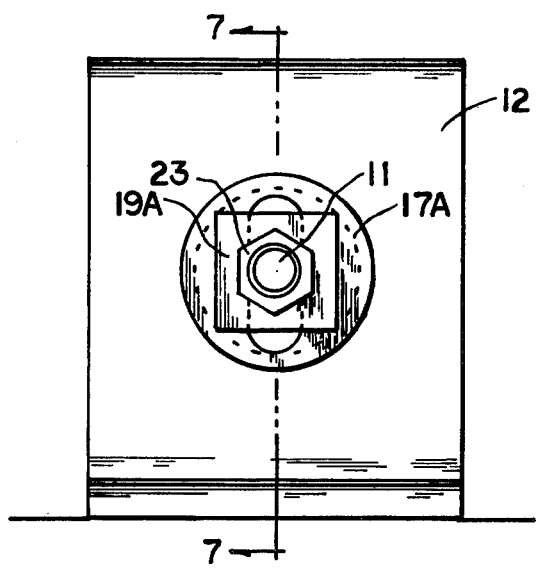
FIG. 6 is an end view of the fastening means of FIG. 3 as seen when facing the inside of the panel.
Figure 7:
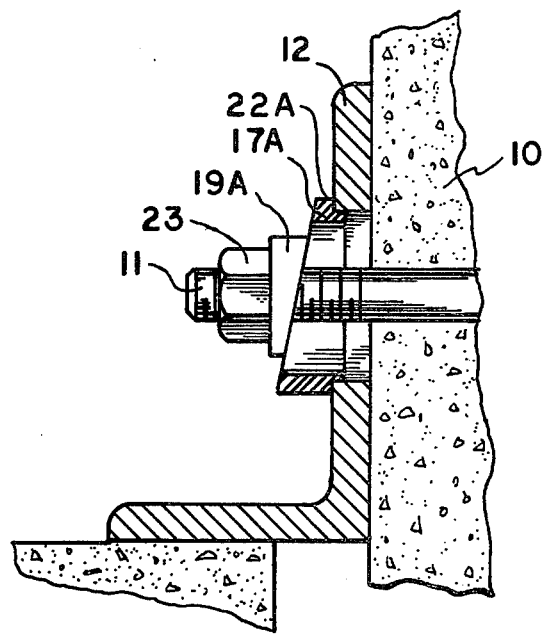
FIG. 7 is a section through the connecting bolt taken on line 7—7 of FIG. 6.

Taking advantage of the design flexibility afforded by mass produced inserts, an arrangement is shown in FIG. 3 where the face 20A of the insert 17A is inclined at an angle with respect to the back 21A of the insert 17A and the vertical face of the support angle 12. The back 21A of the insert 17A is stepped to form a flange 22A. When the insert 17A is set in the hole 16 an inclined plane is formed for wedging engagement with the sloped surface 25A of the beveled washer 19A. The insert 17A is provided with a slotted hole 18A for adjustment.

It will be noted that under some conditions, the panel could shift sideways in the plane of the panel by means of the insert rotating in the hole. Therefore such an adjustment system can only be used where the panel is restrained from such lateral movement by means of other connections and ties. Rotation of the insert can be prevented by forming a flat spot or other irregularity in one or more sides of the hole in the support clip and providing the insert with a matching indentation or projection. Of course, such a provision limits the device to adjustments in one direction only, however, the other advantages inherent in a standarized insert set in an easily formed hole can be utilized for many applications.

Figure 8:
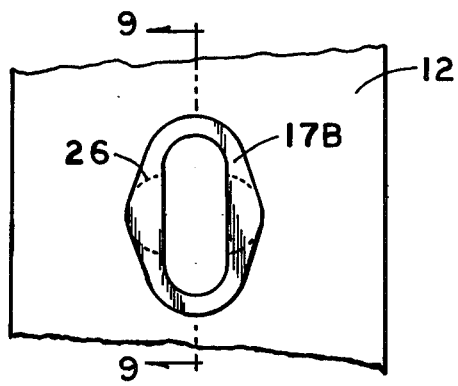
FIG. 8 is a partial view similar to FIG. 6, showing only the inclined face insert and its means of engagement with the support member, of another embodiment of the invention.
Figure 9:
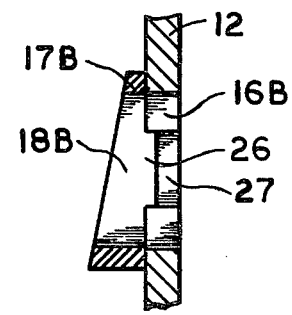
FIG. 9 is a section through the slotted hole taken on line 9—9 of FIG. 8.
Figure 10:
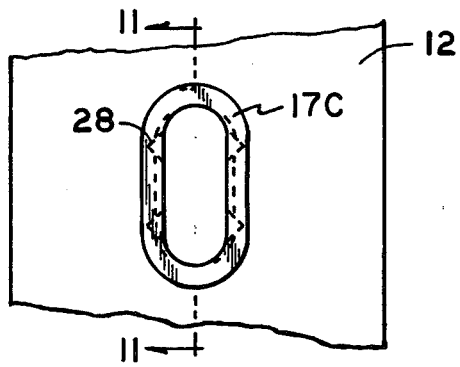
FIG. 10 is a view similar to FIG. 8 showing another means of engagement of an inclined face device with a support member.
Figure 11:
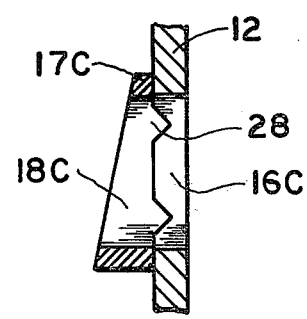
FIG. 11 is a section through the slotted hole taken on line 11—11 of FIG. 10.
Figure 12:
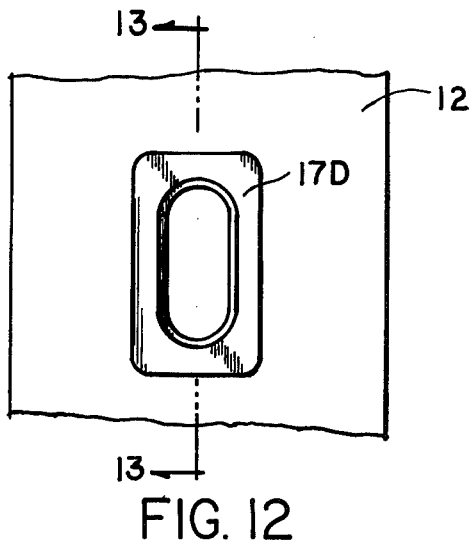
FIG. 12 is a view similar to FIG. 8 showing still another means of preventing movement of an inclined plane adjusting device relative to a support member.
Figure 13:
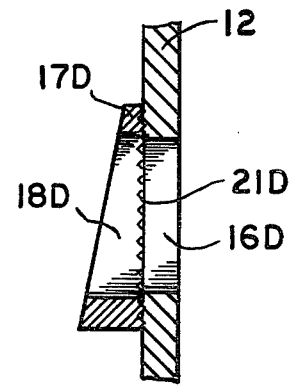
FIG. 13 is a section through the slotted hole taken on line 13—13 of FIG. 12.

Another way in which an insert with an inclined face can be retained in a support clip is shown in FIGS. 8 and 9. Lugs 26 project from the back of the insert 17B and engage matching openings 27 formed in the walls of the slotted hole 16B in the support clip 12. In FIGS. 10 and 11, motion of the inclined plane insert 17C relative to the support clip 12 is prevented by tang-like projections 28 shaped to facilitate their being forced into engagement with the walls of the hole 16C when the connecting bolt is tightened. Under some loading conditions, the wedging induced tensile force in the connecting bolt may be employed to drive the serrated back face 21D of an inclined plane device 17D as shown in FIGS. 12 and 13 into positive engagement with the support angle 12.

Figure 14:
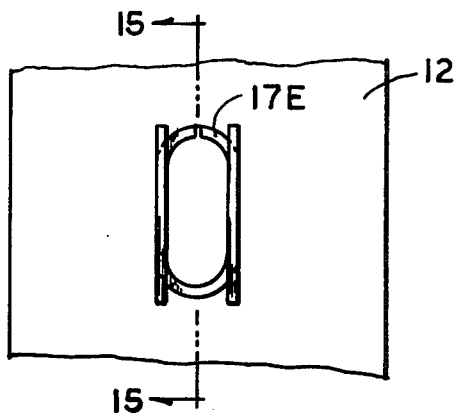
FIG. 14 is a view similar to FIG. 8 in which is shown sheet or plate material formed into a bushing with an integral inclined plane for placement in a slotted hole.
Figure 15:
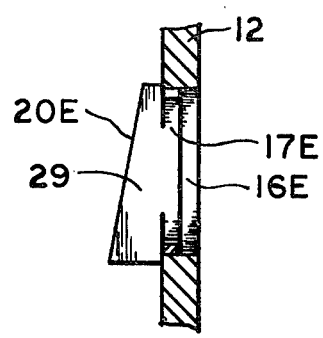
FIG. 15 is a section through the slotted hole taken on line 15—15 of FIG. 14.
Figure 16:
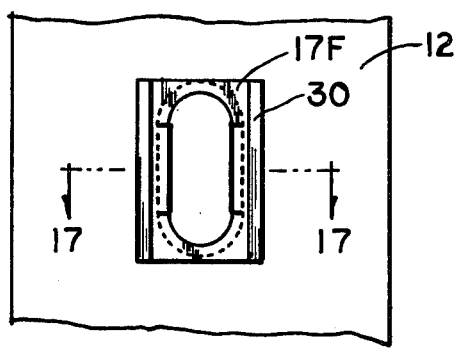
FIG. 16 is a view similar to FIG. 8 showing still another embodiment of the invention.
Figure 17:
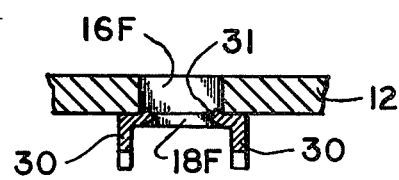
FIG. 17 is a section through the slotted hole taken on line 17—17 of FIG. 16.

Still another insert, manufactured in this case from sheet or plate material, is shown in FIGS. 14 and 15. The material is cut and formed so that one of its edges forms inclined plane surfaces 20E of projecting fins 29, the continuations of which are shaped to form a bushing 17E for positive engagement with a hole 16E in the support member 12. In FIGS. 16 and 17 the projecting fins 30 are connected by a slotted web from which are deformed lug-like projections 31 for positive engagement with the hole 16F in the support angle 12.

It has been found that inclined plane devices can be constructed which require no means of interlocking engagement with the support member, relying entirely on frictional engagement produced by the wedging induced tension to prevent displacement of the wedging device with respect to the support member. FIG. 18 illustrates such a device in which simple inclined planes are utilized as the wedging means. The support angle 12 has a long slot 32 for adjustment of the connecting bolt 11 relative to the support angle 12.

An inclined plane device 33, basically a slotted beveled washer, is fitted over the connecting bolt 11. The back face 34 of the inclined plane device is inclined at an angle $\sigma$ with respect to the front face 35 which is coated with a fluorocarbon material with a very low coefficient of friction. The projecting lug 36 keeps the device aligned with the slot 32. A matching beveled washer 37 is also coated with a fluorocarbon material at its contact surface 38 with the wedging surface 35 of the inclined plane device 33. The beveled washer 37 is held in wedging engagement with the wedging device by a nut 23 threaded onto the connecting bolt. The angle $\sigma$ is limited by the equation $$\tan\angle = \frac{f - u}{uf + 1}$$

where $\sigma$ is the critical angle between the surfaces 34 and 35, which if exceeded causes those force components tending to shift the inclined plane device 33 relative to the support angle 12 to exceed the frictional force between the inclined plane device and the support angle, f is the coefficient of friction for the contact surface between the back 34 of the inclined plane device and the support angle 12, is equal to a force acting normal to the contact surface divided by the maximum frictional force that may be developed between the back face 34 of the inclined plane device and the support angle 12 as a result of that normal force, u is the coefficient of friction for the wedging surfaces 35 and 36, is equal to a force acting normal to the wedging surface divided by the maximum frictional force that may be developed between the wedging surfaces 35 and 36 as a result of that normal force.

As the weight of a supported member is applied through the connecting bolt 11, there is a tendency for the beveled washer 37 to slip relative to the inclined plane device 33 which in turn tends to shift relative to the support clip 12. But any such tendency for shifting of the beveled washer 37 with respect to the inclined plane device 37 induces tension in the connecting bolt 11 because of the presence of the nut 23. The forces tending to shift the inclined plane device 33 relative to the support angle 12 increase as the angle $\sigma$ increases and as the coefficient of friction u between the wedging surfaces 35 and 36 increases. On the other hand, the force resisting shifting increases as the coefficient of friction f between the back face 34 of the inclined plane device and the support clip 12 increases and as the tension in the connecting bolt increases. In the case of inclined plane devices designed with the angle $\sigma$ equal to or less than the critical angle calculated according to the foregoing equation, the product of the coefficient of friction f and the connecting bolt tension induced by wedging increases at a rate equal to or greater than the rate of increase of those forces tending to shift the inclined plane device 33 relative to the support clip 12, thereby eliminating the necessity for interlocking engagement of the device 33 and the clip 12.

It is important to have the angle $\sigma$ as close to the limiting angle as possible while maintaining a satisfactory factor of safety against slippage, because the induced tensile force is accompanied by some shifting of the beveled washer relative to the inclined plane device, the ratio of the amount of shifting to the tensile force varying inversely with the angle $\sigma$. The effective differential friction between the contact surfaces at the back face 34 of the inclined plane device and the support clip 12 and the wedging surfaces 35 and 36 can be increased by serrating the face 34 of the inclined plane device. Such a technique will prove particularly effective where the serrated surface is relatively hard with respect to its engagement surface of the support angle.

It will be apparent that the amount of shifting of a wedging element such as a beveled washer relative to an inclined plane device that will induce sufficient bolt tension to maintain equilibrium of the system will be reduced by any connecting bolt tension produced by a pretightening of the nut. It should also be apparent that the tensile forces in the connecting bolts of wedging devices with low coefficients of friction at the wedging surfaces will be substantially higher than with higher coefficients of friction between the wedging surfaces.

What is claimed is:

1. Fastening means for rigidly locking a first member to a second member wherein said members are provided with surfaces of engagement permitting adjustment relative to each other in a plane defined by said surfaces, said members being subjected to forces tending to shift them relative to each other in one direction within said plane, said fastening means comprising a frustoconically shaped body element having substantially oppositely disposed faces, one of said faces being a conical contact surface for engagement with a corresponding contact surface on said first member, a wedging element disposed for wedging engagement with said body element, said body element and wedging element having corresponding wedging surfaces arranged to limit movement of said first and second members relative to each other in said one direction, said first member having an opening smaller in at least one dimension than the corresponding dimension of said body element so that said body element can not be driven through said opening by forces acting normal to said plane, an edge-portion surrounding said opening forming said corresponding contact surface, and locking means fixedly supported by said second member and arranged to force said wedging element into engagement with said body element and said body element into engagement with said first member, thereby preventing shifting of said body element relative to said first member in order to positively lock said members together at such adjusted position, a portion of said conical surface on the body element extending into said opening in said first member, said body element having a slot extending generally in said one direction, said conical surface being driven by said locking means into engagement with said edge-portion of said opening in said first member, the axis of said frustoconically shaped body element extending substantially normal to said plane.

2. Fastening means as defined in claim 1, wherein the truncating plane of said body element is inclined at an angle relative to its base.

3. A body element as defined in claim 2.

4. A body element as defined in claim 1.

5. Fastening means for rigidly locking a first member to a second member wherein said members are provided with surfaces of engagement permitting adjustment relative to each other in a plane defined by said surfaces, said members being subjected to forces tending to sift them relative to each other in one direction within said plane, said fastening means comprising a body element having substantially oppositely disposed faces, one of said faces being a contact surface for engagement with a corresponding contact surface on said first member, a wedging element disposed for wedging engagement with said body element, said body element and wedging element having corresponding wedging surfaces arranged to limit movement of said first and second members relative to each other in said one direction, said first member having an opening smaller in at least one dimension than the corresponding dimension of said body element so that said body element can not be driven through said opening by forces acting normal to said plane, and locking means fixedly supported by said second member and arranged to force said wedging element into engagement with said body element and said body element into engagement with said first member, thereby preventing shifting of said body element relative to said first member in order to positively lock said members together at such adjusted position, a portion of the body element extending into said opening and arranged to fit closely therein, said body element having a slot elongated generally in said one direction, said one face being driven by said locking means into engagement with the said contact surface surrounding said opening in said first member, the other face of said body element being the edges of fins projecting in a direction substantially normal to said plane, said fins being aligned in a direction generally parallel to said one direction in which said members tend to shift and forming said wedging surfaces of said body element.

6. Fastening means as defined in claim 5, wherein said body element is formed from sheet material, an edge of the material forming said other face.

7. A body element as defined in claim 5.

8. A body element as defined in claim 6.

9. Fastening means for rigidly locking a first member to a second member wherein said members are provided with surfaces of engagement permitting adjustment relative to each other in a plane defined by said surfaces, said members being subjected to forces tending to shift them relative to each other in one direction within said plane, said fastening means comprising a body element having oppositely disposed faces, one of said faces being a contact surface for engagement with a corresponding contact surface on said first member, a wedging element disposed for wedging engagement with said body element, said body element and wedging element having corresponding wedging surfaces arranged to limit movement of said members relative to each other in said one direction, said first member having an opening smaller in at least one dimension that the corresponding dimension of said body element so that said body element can not be driven through said opening by forces acting normal to said plane, said wedging element being movable in a direction normal to said plane while in wedging engagement with said body element, and locking means fixedly supported by said second member and arranged to force said wedging element into engagement with said body element and said body element into engagement with said first member, thereby preventing shifting of said body element relative to said first member in order to positively lock said members together at such adjusted position, said wedging surfaces of said body and wedging elements being so arranged that the ratio of h, the distance said wedging element, if unopposed, would move in a direction normal to said plane, to d, the distance of said unopposed shifting in said one direction, is limited by the equation $$\frac{h}{d} \leq \tan \angle = \frac{f - u}{uf + 1}$$

where $\sigma$ is the critical angle, which if exceeded, causes those force components tending to shift said body element in said one direction relative to said first member to exceed the frictional force resisting said shifting of said body element relative to said first member; f is the coefficient of friction for such contact surfaces of said body element and of said first member; and u is the coefficient of friction for said wedging surfaces of said body element and said wedging element.

10. A body element as defined in claim 9.

11. A wedging element as defined in claim 9.

12. Fastening means as defined in claim 9, at least part of the other of said oppositely disposed faces lies in a plane inclined at an angle with respect to said one face.

13. Fastening means as defined in claim 9, wherein at least one of said corresponding wedging surfaces of said body element and said wedging element is coated with a synthetic resin material.

14. Fastening means as defined in claim 13, wherein said synthetic material is fluorocarbon.

15. Fastening means as defined in claim 9, wherein said engagement surface of said body element is distressed to increase the coefficient of friction f.

16. A body element as defined in claim 12.

17. A wedging element as defined in claim 12.

18. A body element as defined in claim 13.

19. A wedging element as defined in claim 13.

20. A body element as defined in claim 14.

21. A wedging element as defined in claim 14.

22. A body element as defined in claim 15.

23. Fastening means for rigidly locking a first member to a second member wherein said members are provided with surfaces of engagement permitting adjustment relative to each other in a plane defined by said surfaces, said members being subjected to forces tending to shift them relative to each other in one direction within said plane, said fastening means comprising a body element having oppositely disposed faces, one of said faces being a contact surface for engagement with a corresponding contact surface on said first member, a wedging element disposed for wedging engagement with said body element, said body element and wedging element having corresponding wedging surfaces arranged to limit movement of said first and second members relative to each other in said one direction, said body element having a tapered slot the walls of which form said wedging surfaces, and said wedging element comprising a double-tapered member the side surfaces of which are tapered both within said plane in a direction normal thereto, said side surfaces form said corresponding wedging surfaces, said first member having an opening smaller in at least one dimension than the corresponding dimension of said body element so that said body element can not be driven through said opening by forces acting normal to said plane, and locking means fixedly supported by said second member and arranged to force said wedging element into engagement with said body element and said body element into engagement with said first member, thereby preventing shifting of said body element relative to said first member in order to positively lock said members together at such adjusted position.

24. Fastening means as defined in claim 23, wherein a portion of the body element extends into said opening in said first member and is arranged to fit closely therein, said contact surface on said first member surrounding said opening, said body element having a slot elongated generally in said one direction, said one face thereof being driven by said locking means into engagement with said contact surface around said opening in said first member.

25. A body element as defined in claim 24.

* * * * *